United States Patent
Reznik et al.

(10) Patent No.: US 8,686,029 B2
(45) Date of Patent: Apr. 1, 2014

(54) SYNERGISTIC ANTIOXIDANT COMPOSITIONS

(75) Inventors: Gary Reznik, St. Charles, MO (US); David Michael T. Macaraeg, St. Charles, MO (US)

(73) Assignee: Novus International, Inc., St. Charles, MO (US)

( * ) Notice: Subject to any disclaimer, the term of this patent is extended or adjusted under 35 U.S.C. 154(b) by 275 days.

(21) Appl. No.: 13/104,637

(22) Filed: May 10, 2011

(65) Prior Publication Data

US 2011/0280950 A1 Nov. 17, 2011

Related U.S. Application Data

(60) Provisional application No. 61/334,017, filed on May 12, 2010.

(51) Int. Cl.
*A61K 31/35* (2006.01)
*A61K 35/12* (2006.01)
*A61K 36/00* (2006.01)

(52) U.S. Cl.
USPC .............. 514/456; 514/78; 424/522; 424/725

(58) Field of Classification Search
USPC .............................. 514/456, 78; 424/725, 522
See application file for complete search history.

(56) References Cited

U.S. PATENT DOCUMENTS

| | | | |
|---|---|---|---|
| 4,027,043 A | 5/1977 | Schroeder | |
| 4,460,588 A | 7/1984 | Serban | |
| 4,642,317 A | 2/1987 | Palmquist | |
| 4,820,527 A | 4/1989 | Christensen | |
| 5,334,318 A | 8/1994 | Vinci | |
| 5,698,244 A | 12/1997 | Barclay | |
| 5,891,491 A | 4/1999 | Owens | |
| 6,017,564 A | 1/2000 | Owens | |
| 6,955,831 B2 | 10/2005 | Higgs | |
| 2003/0055103 A1* | 3/2003 | Heinzen et al. | 514/456 |
| 2003/0162809 A1 | 8/2003 | Selm | |
| 2004/0076659 A1 | 4/2004 | Shelford | |
| 2005/0175762 A1 | 8/2005 | Richards | |
| 2007/0087104 A1* | 4/2007 | Chanamai | 426/602 |
| 2007/0286932 A1 | 12/2007 | Horgan | |
| 2008/0015217 A1 | 1/2008 | Vasquez-Anon et al. | |
| 2009/0317342 A1 | 12/2009 | Rudolph | |

OTHER PUBLICATIONS

Han, "Carbohydrate fermentation and nitrogen metabolism of a finishing beef diet by ruminal microbes in continuous cultures as affected by ethoxyquin and(or) supplementation of monensin and tylosin," J. Anim. Sci., 2002, vol. 80, pp. 1117-1123.

Dunkley, Compounds in Milk Accompanying Feeding of Ethoxyquin, J. Dairy Sci., 1968, vol. 51, No. 8, pp. 1215-1218.

Dunkley, Supplementing Rations with Tocopherol and Ethoxyquin to Increase Oxidative Stability, J. Dairy Sci., 1967, vol. 50, No. 4, pp. 492.

Van Nevel, "Determination of rumen microbial growth in vitro from Plabeled phosphate incorporation," British Journal of Nutrition, 1977, vol. 38, pp. 101-114.

(Continued)

*Primary Examiner* — Rosanne Kosson

(57) ABSTRACT

Antioxidant compositions for the stabilization of fat sources against oxidation, stabilized fat source compositions, and methods of stabilizing fat sources against oxidation are described. In particular, an antioxidant emulsion that includes quercetin in addition to at least one other ingredient and a lipid carrier is described.

15 Claims, 1 Drawing Sheet

(56) References Cited

OTHER PUBLICATIONS

Linn, "Feed Efficiency of Lactating Dairy Cows," retrieved from web on Jun. 2, 2010, URL: http://web.archive.org/web/2000223164540/http://www.ansci.umn.edu/dairy/topics/feed_efficiency.pdf, 9 pgs.

Office Action from U.S. Appl. No. 11/676,365, dated Jun. 2, 2010, 22 pages.
Office Action from U.S. Appl. No. 11/676,365, dated Sep. 9, 2009, 27 pages.
International Search Report, dated Jul. 19, 2011, 8 pages.

* cited by examiner

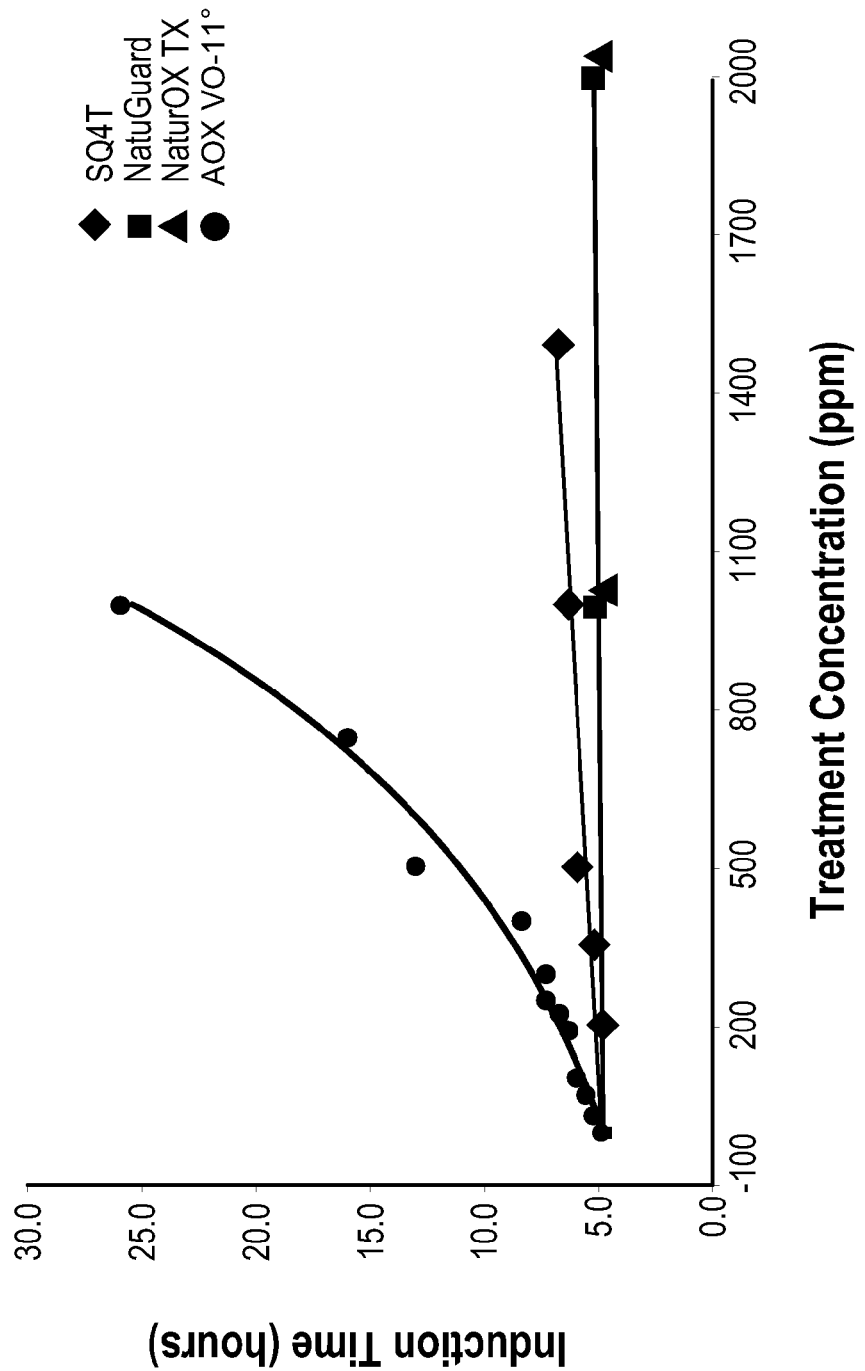

SYNERGISTIC ANTIOXIDANT COMPOSITIONS

CROSS-REFERENCE TO RELATED APPLICATIONS

This application claims priority to U.S. Provisional Application No. 61/334,017 filed on May 12, 2010, which is hereby incorporated by reference in its entirety.

FIELD OF THE INVENTION

The present invention relates to antioxidant compositions for the stabilization of fat sources against oxidation. In particular, the present invention relates to an antioxidant emulsion that includes quercetin in addition to at least one other ingredient and a lipid carrier.

BACKGROUND OF THE INVENTION

Lipid-rich fat sources such as poultry fats and other animal fats, poultry meal and other animal meals, vegetable oils, fish oils, yellow grease, and fish meals are commonly included in a variety of foods for human consumption, animal feeds, and nutritional supplements for both humans and animals. Although these fat sources are energy-rich nutritional compounds and may further possess useful therapeutic properties as in the case of polyunsaturated fatty acids, the fat sources are vulnerable to a number of environmental and structural factors during manufacturing and storage that may reduce their efficacy or possibly render them unusable. In particular, many lipid-rich fat sources may undergo undesired oxidation due to exposure to air, light, internally generated free radicals, and trace metals.

In order to stabilize lipid-containing oils and fat products, potent synthetic antioxidants such as ethoxyquin, TBHQ, BHT, or BHA may be added, but the consumption of synthetic antioxidants may lead to negative health effects. Alternatively, synthetic and natural antioxidants of low efficacy, such as mixed tocopherols, rosemary extracts, phosphoric acid, and propyl gallate may be added to inhibit oxidation. High concentrations of other natural compounds with modest antioxidant properties may also be added, including monosaccharides, polysaccharides, and fiber. The use of natural antioxidants may result in more healthful food and feed products, but product quality may suffer during manufacturing and storage due to the low efficacy of natural antioxidants.

A need exists in the art for a natural antioxidant composition that possesses an efficacy that is at least as high as the potent synthetic antioxidants and does not induce the adverse health effects of the synthetic antioxidants.

SUMMARY OF INVENTION

One iteration of the disclosure encompasses an emulsion comprising quercetin, lecithin, and a lipid carrier, wherein the ratio of quercetin to lecithin is from about 1:3 to about 1:5.

An additional iteration of the disclosure encompasses an emulsion composition consisting of quercetin, lecithin, and a lipid carrier, wherein the ratio of quercetin to lecithin is from about 1:3 to about 1:5.

A further iteration of the disclosure is directed to a composition comprising a liquid fat source and an emulsion comprising quercetin, lecithin, and a lipid carrier, wherein the ratio of quercetin to lecithin is at least 1:3.

An additional iteration of the disclosure provides a method to reduce the oxidation of a liquid fat source. The method comprises contacting the liquid fat source with an emulsion comprising quercetin, lecithin, and a lipid carrier, wherein the ratio of quercetin to lecithin is from about 1:3 to about 1:5.

Other features and iterations of the disclosure are described in more detail herein.

BRIEF DESCRIPTION OF DRAWING

FIG. 1 is a graph comparing the induction time of an embodiment of the antioxidant emulsion composition that includes quercetin and lecithin (AOX VO-1 1°) to existing antioxidant compositions: a mixture of ethoxyquin and TBHQ (SQ4T); a mixture of tocopherols, rosemary extract, and soybean oil (NatuGuard); and a mixture with a high percentage of delta-tocopherols, rosemary extract, and an oil carrier (NaturOx TX).

DETAILED DESCRIPTION

The inventors have discovered an antioxidant emulsion composition that includes a synergistic combination of all-natural antioxidants that are highly effective at inhibiting the oxidation of lipid-rich fat sources when added to the fat sources at low concentrations relative to existing natural and synthetic antioxidants. This synergistic antioxidant emulsion system may be used at a low concentration for the stabilization of a variety of liquid, semi-solid, and solid fat sources including poultry fats, animal fats, fish oils, fish meals, vegetable oils, and yellow grease.

Provided herein are antioxidant emulsion compositions that include quercetin and other ingredients, such as lecithin, phosphoric acid, or propyl gallate, that synergistically provide superior antioxidative properties compared to the properties of quercetin or any of the other ingredients in the composition alone. The antioxidant emulsion compositions also include a lipid carrier in which the quercetin and other ingredients of the emulsion are suspended.

It has been discovered by the inventors that by combining the quercetin with at least one other ingredient such as lecithin in the antioxidant emulsion composition, the efficacy of the quercetin as an antioxidant is greatly enhanced. As a result, a desired degree of stabilization may be achieved using much lower concentrations of the various embodiments of the antioxidant emulsion composition compared to the concentrations of a composition containing quercetin alone, or any one of the other ingredients in isolation.

The emulsion compositions may be added to a variety of liquid fat sources such as some fish oils or vegetable oils, semi-solid fat sources such as some vegetable oils, and solid fat sources such as butter or fish meal in order to stabilize the fat source against oxidation.

(I) Antioxidant Emulsion Compositions

One aspect of the invention provides an antioxidant emulsion composition that includes quercetin and at least one other ingredient, such as lecithin, citric acid, phosphoric acid, ethoxyquin, or propyl gallate, as well as a lipid carrier. It has been discovered that by combining the quercetin with at least one other ingredient such as lecithin in the antioxidant emulsion composition, the efficacy of the quercetin is greatly enhanced.

In various embodiments, the antioxidant emulsion composition includes quercetin in an amount ranging from about 1% to about 50% by weight. Quercetin is further included in an amount such that ratio of the mass of quercetin to the combined mass of the one or more other ingredients, excluding the lipid carrier ranges from about 10:1 to about 1:10, depending on the particular species of the one or more other ingredients in the antioxidant emulsion composition. In these embodiments, the antioxidant emulsion composition further includes at least one other ingredient such as lecithin or phosphoric acid in an amount ranging from about 1% to about 50% by weight. These antioxidant emulsion compositions further include a lipid carrier such as a vegetable oil in an amount ranging from about 30% to about 70% by weight.

The particular composition of the antioxidant emulsion may depend upon the particular fat source to be stabilized. For example, an antioxidant emulsion composition for the stabilization of a liquid fat source may include quercetin, lecithin, and a lipid carrier. By contrast, an antioxidant emulsion composition for the stabilization of a solid or semi-solid fat source may include quercetin, phosphoric acid, and a lipid carrier.

The ingredients of the antioxidant emulsion composition, methods of producing of the emulsion, methods of using the emulsion, and exemplary antioxidant emulsion compositions are described in detail below.

a) Quercetin

The embodiments of the antioxidant emulsion composition include an amount of quercetin, a plant-derived flavonoid derived from fruits, berries, vegetables, and other plant matter such as tree bark and tea leaves. The chemical structure of quercetin is illustrated in formula (I) below:

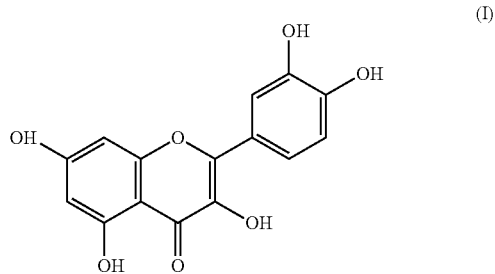 [SMILES: O=c1c(O)c(-c2ccc(O)c(O)c2)oc2cc(O)cc(O)c12]

(I)

The quercetin may be synthetically produced, or the quercetin may be isolated from a plant extract using known methods including but not limited to solvent extraction. Fruit extracts may be used as a natural source of quercetin. Non-limiting examples of fruit extracts suitable as natural sources of quercetin include the berries of plants found in the genus *Vaccinium*, including blueberry, bilberry, cowberry, cranberry, crowberry, farkleberry, lingonberry, partridgeberry, huckleberry, whortleberry, sparkleberry, bearberry, craneberry, lingonberry, lingberry, bilberry, burren myrtle, dyeberry, hurtleberry, whinberry, or wineberry, and combinations thereof. Other non-limiting examples of natural sources of quercetin include the extracts of cherry, raspberry, blackberry, strawberry, pomegranate, apple, onion, beans, green tea, black tea, and combinations thereof.

In one embodiment, the antioxidant emulsion composition includes quercetin in an amount ranging from about 1% to about 50% by weight. In other embodiments, the antioxidant emulsion composition includes quercetin in an amount ranging from about 1% to about 10% by weight, from about 5% to about 15% by weight, from about 10% to about 20% by weight, from about 15% to about 25% by weight, from about 20% to about 30% by weight, from about 25% to about 35% by weight, from about 30% to about 40% by weight, from about 35% to about 45% by weight, and from about 40% to about 50% by weight.

In other compositions, the ratio of the mass of quercetin to the combined mass of the one or more other ingredients, excluding the lipid carrier ranges from about 10:1 to about 8:1, from about 9:1 to about 7:1, from about 8:1 to about 6:1, from about 7:1 to about 5:1, from about 6:1 to about 4:1, from about 5:1 to about 3:1, from about 4:1 to about 2:1, from about 3:1 to about 1:1, from about 2:1 to about 1:2, from about 1:1 to about 1:3, from about 1:2 to about 1:4, from about 1:3 to about 1:5, from about 1:4 to about 1:6, from about 1:5 to about 1:7, from about 1:6 to about 1:8, from about 1:7 to about 1:9, and from about 1:8 to about 1:10.

The antioxidant emulsion composition may be incorporated into a liquid fat source, a semi-solid fat source, or a solid fat source in an amount resulting in an equivalent quercetin concentration ranging from about 0.001 ppm to about 3000 ppm, In other embodiments, the equivalent quercetin concentration may range from about 50 ppm to about 150 ppm, from about 100 ppm to about 300 ppm, from about 200 ppm to about 400 ppm, from about 300 ppm to about 500 ppm, from about 400 ppm to about 600 ppm, from about 500 ppm to about 700 ppm, from about 600 ppm to about 800 ppm, from about 700 ppm to about 900 ppm, from about 800 ppm to about 1000 ppm, from about 900 ppm to about 1100 ppm, from about 1000 ppm to about 1400 ppm, from about 1200 ppm to about 1600 ppm, from about 1400 ppm to about 1800 ppm, from about 1600 ppm to about 2000 ppm, from about 1800 ppm to about 2200 ppm, from about 2000 ppm to about 2500 ppm, from about 2250 ppm to about 2750 ppm, and from about 2500 ppm to about 3000 ppm.

The particular equivalent quercetin concentration at which the antioxidant emulsion composition is combined with the fat source may depend upon one or more factors, including but not limited to the particular fat source to be stabilized, the desired degree of stabilization, and the one or more other ingredients included in the antioxidant emulsion composition.

The one or more other ingredients included in embodiments of the antioxidant emulsion composition synergistically enhance the antioxidative efficacy of the composition. As a result, the particular choice of one or more other ingredients for the antioxidant emulsion composition is an important factor governing the efficacy of the composition, and by extension the concentration of composition needed to achieve a desired level of stabilization of a fat source.

b) Other Ingredients

Various embodiments of the antioxidant emulsion composition include at least one other ingredient. The at least other one ingredient may act as an emulsifier, as an additional antioxidant to supplement the quercetin, or any combination thereof. Non-limiting examples of other ingredients suitable for inclusion in embodiments of the antioxidant emulsion composition include emulsifiers, natural and synthetic antioxidants, and combinations thereof.

As described above, the one or more other ingredients may be included in embodiments of the antioxidant emulsion composition such that the ratio of the mass of quercetin to the combined mass of the one or more other ingredients, excluding the lipid carrier ranges from about 10:1 to about 1:10. In other embodiments, the one or more other ingredients may be included in the antioxidant emulsion composition in an amount ranging from about 1% to about 10% by weight, from about 5% to about 15% by weight, from about 10% to about 20% by weight, from about 15% to about 25% by weight, from about 20% to about 30% by weight, from about 25% to about 35% by weight, from about 30% to about 40% by weight, from about 35% to about 45% by weight, and from about 40% to about 50% by weight. The particular amount of the one or more ingredients that may be included in the antioxidant emulsion composition may depend on at least one of several factors, including but not limited to the particular species of other ingredient included in the composition, the desired level of stabilization, and the particular type of fat source.

Specific examples of emulsifiers as well as natural and synthetic antioxidants are described further below.

(i) emulsifiers

The one or more ingredients included in embodiments of the antioxidant emulsion composition may be emulsifiers, including but not limited to food-grade emulsifiers. Non-limiting examples of food-grade emulsifiers include acetic acid esters of monoglycerides and diglycerides of fatty acids, alginic acid, ammonium alginate, ammonium phosphatides, beta-cyclodextrin, brominated vegetable oil, calcium alginate, calcium stearoyl lactylate, calcium tartrate, carrageenan, choline salts and esters, citric acid esters of monoglycerides and diglycerides of fatty acids, crosslinked sodium carboxymethylcellulose, diacetyltartaric acid esters of monoglycerides and diglycerides of fatty acids, dimethylpolysiloxane, dioctyl sodium sulfosuccinate, diphosphates, enzymatically hydrolyzed carboxymethyl cellulose, gelatine, gellan gum, glycerol esters of wood rosins, gum acacia, gum Arabic, karaya gum, lactic acid esters of mono- and diglycerides of fatty acids, lactylated fatty acid esters of glycerol and propylene glycol, lecithins, locust bean gum, magnesium salts of fatty acids, magnesium stearate, metatartaric acid, methylcellulose, mixed acetic and tartaric acid esters of mono- and diglycerides of fatty acids, mono- and diglycerides of fatty acids such as glyceryl monostearate, glyceryl distearate, pectin, polyglycerol esters of fatty acids, polyglycerol polyricinoleate, polyoxyethylene (40) stearate, polyoxyethylene (8) stearate, polyphosphates, polysorbate 20, polysorbate 40, polysorbate 60, polysorbate 65, polysorbate 80, potassium alginate, processed eucheuma seaweed, propylene glycol alginate, propane-1,2-diol alginate, propylene glycol esters of fatty acids, sodium alginate, sodium aluminum phosphate, sodium carboxymethylcellulose, sodium stearoyl lactylate, sodium, potassium and calcium salts of fatty acids, sorbitan monolaurate, sorbitan monooleate, sorbitan monopalmitate, sorbitan monostearate, sorbitan tristearate, sorbitol, stearyl tartarate, sucroglycerides, sucrose acetate isobutyrate, sucrose esters of fatty acids, tannins, tartaric acid esters of mono- and diglycerides of fatty acids, thermally oxidised soya bean oil, tragacanth, and triphosphates.

In an exemplary embodiment, the at least one additional ingredient is lecithin. In this embodiment, the antioxidant emulsion composition may include lecithin in an amount ranging from about 30% to about 60% by weight. The composition may include lecithin in an amount ranging from about 30% to about 40% by weight, from about 35% to about 45% by weight, from about 40% to about 50% by weight, from about 45% to about 55% by weight, and from about 50% to about 60% by weight. Further, the lecithin may be included in an amount such that the mass ratio of quercetin to lecithin is from about 1:3 to about 1:5, or from about 1:3 to about 1:4, from about 1:35 to about 1:45, and from about 1:4 to about 1:5.

In this same embodiment, the antioxidant emulsion composition may be incorporated into a liquid fat source, a semi-solid fat source, or a solid fat source in an amount resulting in an equivalent lecithin concentration ranging from about 200 ppm to about 600 ppm, or from about 400 ppm to about 800 ppm, from about 600 ppm to about 1000 ppm, from about 800 ppm to about 1200 ppm, from about 1000 ppm to about 1400 ppm, from about 1200 ppm to about 1600 ppm, from about 1400 ppm to about 1800 ppm, from about 1600 ppm to about 2000 ppm, from about 1800 ppm to about 2200 ppm, from about 2000 ppm to about 2400 ppm, from about 2200 ppm to about 2600 ppm, from about 2400 ppm to about 2800 ppm, and from about 2600 ppm to about 3000 ppm.

The particular amount of lecithin that may be included in the antioxidant emulsion composition may depend on at least one of several factors, including but not limited to the particular species of other ingredient included in the composition, the desired level of stabilization, and the particular type of fat source.

(ii) Antioxidants

The one or more ingredients included in antioxidant emulsion composition may be additional antioxidants to addition to the quercetin, including but not limited to food-grade antioxidant additives. Suitable food-grade antioxidants may be natural or synthetic in origin. Suitable antioxidants include, but are not limited to, ascorbic acid and its salts, ascorbyl palmitate, ascorbyl stearate, anoxomer, N-acetylcysteine, benzyl isothiocyanate, m-aminobenzoic acid, o-aminobenzoic acid, p-aminobenzoic acid (PABA), butylated hydroxyanisole (BHA), butylated hydroxytoluene (BHT), caffeic acid, calcium ascorbate, calcium bisulfite, calcium hydrogen sulfite, calcium sulfite, canthaxantin, alpha-carotene, beta-carotene, beta-caraotene, beta-apo-carotenoic acid, carnosol, carvacrol, catechins, cetyl gallate, chlorogenic acid, citric acid and its salts, clove extract, coffee bean extract, p-coumaric acid, 3,4-dihydroxybenzoic acid, N,N'-diphenyl-p-phenylenediamine (DPPD), dilauryl thiodipropionate, disodium ethylenediaminetetraacetate, distearyl thiodipropionate, 2,6-di-tert-butylphenol, dodecyl gallate, edetic acid, ellagic acid, erythorbic acid, sodium erythorbate, esculetin, esculin, 6-ethoxy-1,2-dihydro-2,2,4-trimethylquinoline, ethyl gallate, ethyl maltol, ethylenediaminetetraacetic acid (EDTA), eucalyptus extract, eugenol, ferulic acid, flavonoids (e.g., catechin, epicatechin, epicatechin gallate, epigallocatechin (EGO), epigallocatechin gallate (EGCG), polyphenol epigallocatechin-3-gallate), flavones (e.g., apigenin, chrysin, luteolin), flavonols (e.g., datiscetin, myricetin, daemfero), flavanones, fraxetin, fumaric acid, gallic acid, gentian extract, gluconic acid, glucose oxidase, glycine, gum guaiacum, hesperetin, alpha-hydroxybenzyl phosphinic acid, hydroxycinammic acid, hydroxyglutaric acid, hydroquinone, N-hydroxysuccinic acid, hydroxytyrosol, hydroxyurea, isopropyl citrates, rice bran extract, lactic acid and its salts, lecithin, lecithin citrate; R-alpha-lipoic acid, lutein, lycopene, malic acid, maltol, 5-methoxy tryptamine, methyl gallate, monoglyceride citrate; monoisopropyl citrate; morin, beta-naphthoflavone, nordihydroguaiaretic acid (NDGA), octyl gallate, oxalic acid, oxystearin, palmityl citrate, phenothiazine, phosphatidylcholine, phosphoric acid, phosphates, phytic acid, phytylubichromel, pimento extract, potassium ascorbate, potassium bisulfite, potassium metabisulfite, potassium sulfite, propyl gallate, polyphosphates, quercetin, trans-resveratrol, rosemary extract, rosmarinic acid, sage extract, sesamol, silymarin, sinapic acid, sodium ascorbate, sodium bisulfite, sodium erythorbate, sodium metabisulfite, sodium sulfite, stannous chloride, succinic acid, stearyl citrate, sulfur dioxide, syringic acid, tartaric acid, thymol, tocopherols (i.e., alpha-, beta-, gamma- and delta-tocopherol), tocotrienols (i.e., alpha-, beta-, gamma- and delta-tocotrienols), tyrosol, vanillic acid, 2,6-di-tert-butyl-4-hydroxymethylphenol (i.e., lonox 100), 2,4-(tris-3',5'-bi-tertbutyl-4'-hydroxybenzyl)-mesitylene (i.e., Ionox 330), 2,4,5-trihydroxybutyrophenone, ubiquinone, tertiary butyl hydroquinone (TBHQ), 6-ethoxy-2,2,4-trimethyl-1,2-dihydroquinoline (ethoxyquin), thiodipropionic acid, trihydroxy butyrophenone, tryptamine, tyramine, uric acid, vitamin K and derivates, vitamin Q10, wheat germ oil, zeaxanthin, or combinations thereof.

The particular species and amount of antioxidant that may be included in the antioxidant emulsion composition as an additional ingredient may depend on at least one of several factors, including but not limited to the particular species of other ingredients included in the composition, the desired level of stabilization, and the particular type of fat source to be stabilized.

(ii-a) Phosphoric Acid

In one exemplary embodiment, the at least one additional ingredient is phosphoric acid. In this embodiment, the antioxidant emulsion composition may include phosphoric acid in an amount ranging from about 20% to about 60% by weight. The composition may include phosphoric acid in an amount ranging from about 20% to about 30% by weight, from about 25% to about 35% by weight, from about 30% to about 40% by weight, from about 35% to about 45% by weight, from about 40% to about 50% by weight, from about 45% to about 55% by weight, and from about 50% to about 60% by weight.

Further, the phosphoric acid may be included in an amount such that the mass ratio of quercetin to phosphoric acid is from about 1:2.5 to about 1:8, or from about 1:2.5 to about 1:3.5, from about 1:3 to about 1:4, from about 1:3.5 to about 1:4.5, from about 1:4 to about 1:5, from about 1:4.5 to about 1:5.5, from about 1:5 to about 1:6, from about 1:5.5 to about 1:6.5, from about 1:6 to about 1:7, from about 1:6.5 to about 1:7.5, and from about 1:7 to about 1:8.

This embodiment of the antioxidant emulsion composition may be incorporated into a liquid fat source, a semi-solid fat source, or a solid fat source in an amount resulting in an equivalent phosphoric acid concentration ranging from about 100 ppm to about 1600 ppm, or from about 100 ppm to about 400 ppm, from about 200 ppm to about 600 ppm, from about 400 ppm to about 800 ppm, from about 600 ppm to about 1000 ppm, from about 800 ppm to about 1200 ppm, from about 1000 ppm to about 1400 ppm, and from about 1200 ppm to about 1600 ppm.

(ii-b) Citric Acid

In another exemplary embodiment, the at least one additional ingredient is citric acid. In this embodiment, the antioxidant emulsion composition may include citric acid in an amount ranging from about 5% to about 50% by weight. The composition may include citric acid in an amount ranging from about 5% to about 15% by weight, from about 10% to about 20% by weight, from about 15% to about 25% by weight, from about 20% to about 30% by weight, from about 25% to about 35% by weight, from about 30% to about 40% by weight, from about 35% to about 45% by weight, and from about 40% to about 50% by weight.

Further, the citric acid may be included in an amount such that the mass ratio of quercetin to citric acid is from about 2:1 to about 5:1, or from about 2:1 to about 3.1, from about 2.5:1 to about 3.5:1, from about 3:1 to about 4:1, from about 3.5:1 to about 4.5:1, and from about 4:1 to about 5:1.

This embodiment of the antioxidant emulsion composition may be incorporated into a liquid fat source, a semi-solid fat source, or a solid fat source in an amount resulting in an equivalent citric acid concentration ranging from about 100 ppm to about 500 ppm, or from about 100 ppm to about 300 ppm, from about 200 ppm to about 400 ppm, and from about 300 ppm to about 500 ppm.

(ii-c) Ethoxyquin

In yet another exemplary embodiment, the at least one additional ingredient is ethoxyquin. Ethoxyquin may be synthesized, or may be obtained commercially (Santoquin, Novus International, St. Louis, USA). In this embodiment, the antioxidant emulsion composition may include ethoxyquin in an amount ranging from about 5% to about 35% by weight. The composition may include citric acid in an amount ranging from about 5% to about 15% by weight, from about 10% to about 20% by weight, from about 15% to about 25% by weight, from about 20% to about 30% by weight, and from about 25% to about 35% by weight. Further, the ethoxyquin may be included in an amount such that the mass ratio of quercetin to ethoxyquin is from about 1:0.25 to about 1:1, or from about 1:0.25 to about 1:0.35, from about 1:0.3 to about 1:0.4, from about 1:0.35 to about 1:0.45, from about 1:0.4 to about 1:0.5, from about 1:0.45 to about 1:0.55, from about 1:0.5 to about 1:0.6, from about 1:0.55 to about 1:0.65, from about 1:0.6 to about 1:0.7, from about 1:0.65 to about 1:0.75, from about 1:0.7 to about 1:0.8, from about 1:0.75 to about 1:0.85, from about 1:0.8 to about 1:0.9, from about 1:0.85 to about 1:0.95, and from about 1:0.9 to about 1:1.

This embodiment of the antioxidant emulsion composition may be incorporated into a liquid fat source, a semi-solid fat source, or a solid fat source in an amount resulting in an equivalent ethoxyquin concentration ranging from about 50 ppm to about 1000 ppm, or may range from about 50 ppm to about 150 ppm, from about 100 ppm to about 300 ppm, from about 200 ppm to about 400 ppm, from about 300 ppm to about 500 ppm, from about 400 ppm to about 600 ppm, from about 500 ppm to about 700 ppm, from about 600 ppm to about 800 ppm, from about 700 ppm to about 900 ppm, and from about 800 ppm to about 1000 ppm.

(ii-d) Propyl Gallate and Lecithin

In still yet another exemplary embodiment, the additional ingredients are propyl gallate in combination with lecithin. In this embodiment, the antioxidant emulsion composition may include propyl gallate in an amount ranging from about 1% to about 5% by weight. The composition may include citric acid in an amount ranging from about 1% to about 2% by weight, from about 1.5% to about 2.5% by weight, from about 2.0% to about 3.0% by weight, from about 2.5% to about 3.5% by weight, from about 3.0% to about 4.0% by weight, from about 3.5% to about 4.5% by weight, and from about 4.0% to about 5.0% by weight. Further, the propyl gallate may be included in an amount such that the mass ratio of quercetin to propyl gallate is from about 1:0.2 to about 1:0.6, or from about 1:0.2 to about 1:0.3, from about 1:0.25 to about 1:0.35, from about 1:0.3 to about 1:0.4, from about 1:0.35 to about 1:0.45, from about 1:0.4 to about 1:0.5, from about 1:0.45 to about 1:0.55, and from about 1:0.5 to about 1:0.6.

This embodiment of the antioxidant emulsion composition may be incorporated into a liquid fat source, a semi-solid fat source, or a solid fat source in an amount resulting in an equivalent propyl gallate concentration ranging from about 50 ppm to about 300 ppm, or may range from about 50 ppm to about 150 ppm, and from about 100 ppm to about 300 ppm.

c) Lipid Carrier

The embodiments of the antioxidant emulsion composition include an amount of lipid carrier. In one embodiment, the antioxidant emulsion composition includes the lipid carrier in an amount ranging from about 30% to about 70% by weight. In other embodiments, the antioxidant emulsion composition includes quercetin in an amount ranging from about 30% to about 40% by weight, from about 35% to about 45% by weight, from about 40% to about 50% by weight, from about 45% to about 55% by weight, from about 50% to about 60% by weight, from about 55% to about 65% by weight, and from about 60% to about 70% by weight.

A variety of lipid carriers are suitable for use in the antioxidant emulsion compositions, including but not limited to fatty acids, fatty acid esters, fatty acid methyl esters (FAMEs), glycerides, glycolipids, phospholipids, sphingolipids, cholesterol, steroid hormones, sterols, and polyisoprenoids. The lipid carrier may be a mixture of lipids or a purified lipid.

The lipid carrier may be a fat or oil that may include monoglycerides, diglycerides, triglycerides, and free fatty acids. The glycerides of fats and oils may typically include fatty acids that are at least 4 carbons in length, and more preferably, fatty acids that range in length from 16 to 24 carbons. The fatty acid may be saturated or unsaturated. Any unsaturated fatty acid may be monounsaturated or polyunsaturated.

One lipid carrier suitable for embodiments of the antioxidant emulsion compositions is a polyunsaturated fatty acid (PUFA), which has at least two carbon-carbon double bonds generally in the cis-configuration. The PUFA may be a long chain fatty acid having at least 18 carbons atoms. The PUFA may be an omega-3 fatty acid in which the first double bond occurs in the third carbon-carbon bond from the methyl end of the carbon chain (i.e., opposite the carboxyl acid group). Examples of omega-3 fatty acids include alpha-linolenic acid (18:3, ALA), stearidonic acid (18:4), eicosatetraenoic acid (20:4), eicosapentaenoic acid (20:5; EPA), docosatetraenoic acid (22:4), n-3 docosapentaenoic acid (22:5; n-3DPA), and docosahexaenoic acid (22:6; DHA). The PUFA may also be an omega-6 fatty acid, in which the first double bond occurs in the sixth carbon-carbon bond from the methyl end. Examples of omega-6 fatty acids include linoleic acid (18:2), gamma-linolenic acid (18:3), eicosadienoic acid (20:2), dihomo-gamma-linolenic acid (20:3), arachidonic acid (20:4), docosadienoic acid (22:2), adrenic acid (22:4), and n-6 docosapentaenoic acid (22:5). The fatty acid may also be an omega-9 fatty acid, such as oleic acid (18:1), eicosenoic acid (20:1), mead acid (20:3), erucic acid (22:1), and nervonic acid (24:1).

In still another embodiment, the oxidizable material may be an animal-derived fat. Non-limiting examples of suitable animal-derived fats include poultry fat, beef tallow, mutton tallow, butter, pork lard, whale blubber, and yellow grease (which may be a mixture of vegetable and animal fats).

In other embodiments, the lipid carrier may be a plant-derived oil. Plant or vegetable oils are generally extracted from the seeds of a plant, but may also be extracted from other parts of the plant. Non-limiting examples of plant or vegetable oils include acai oil, almond oil, amaranth oil, apricot seed oil, argan oil, avocado seed oil, babassu oil, ben oil, blackcurrant seed oil, Borneo tallow nut oil, borage seed oil, buffalo gourd oil, canola oil, carob pod oil, cashew oil, castor oil, coconut oil, coriander seed oil, corn oil, cottonseed oil, evening primrose oil, false flax oil, flax seed oil, grapeseed oil, hazelnut oil, hemp seed oil, kapok seed oil, lallemantia oil, linseed oil, macadamia oil, meadowfoam seed oil, mustard seed oil, okra seed oil, olive oil, palm oil, palm kernel oil, peanut oil, pecan oil, pequi oil, perilla seed oil, pine nut oil, pistachio oil, poppy seed oil, prune kernel oil, pumpkin seed oil, quinoa oil, ramtil oil, rice bran oil, safflower oil, sesame oil, soybean oil, sunflower oil, tea oil, thistle oil, walnut oil, or wheat germ oil. The plant derived oil may also be hydrogenated or partially hydrogenated.

Another lipid carrier suitable for embodiments of the antioxidant emulsion compositions is a seafood-derived oil. The seafood may be a vertebrate fish or a marine organism, such that the oil may be fish oil or marine oil. Long-chain (20C, 22C) omega-3 and omega-6 fatty acids are found in seafood. The ratio of omega-3 to omega-6 fatty acids in seafood ranges from about 8:1 to 20:1. Seafood from which oil rich in omega-3 fatty acids may be derived include, but are not limited to, abalone scallops, albacore tuna, anchovies, catfish, clams, cod, gem fish, herring, lake trout, mackerel, menhaden, orange roughy, salmon, sardines, sea mullet, sea perch, shark, shrimp, squid, trout, and tuna.

In still other embodiments, the lipid carrier may be an algae-derived oil. Suitable commercially available algae-derived oils include those from *Crypthecodinium cohnii* and *Schizochytrium* sp. Other suitable species of algae, from which oil is extracted, include *Aphanizomenon flos-aquae, Bacilliarophy* sp., *Botryococcus braunii, Chlorophyceae* sp., *Dunaliella tertiolecta, Euglena gracilis, lsochrysis galbana, Nannochloropsis salina, Nannochloris* sp., *Neochloris oleoabundans, Phaeodactylum tricomutum, Pleurochrysis carterae, Prymnesium parvum, Scenedesmus dimorphus, Spirulina* sp., and *Tetraselmis chui*.

In an alternate embodiment, the lipid carrier may be a spice or fragrance oil. Non-limiting examples of suitable spice or fragrant oils include angelica oil, anise oil, basil oil, bergamot oil, orange oil, black pepper oil, calamus oil, citronella oil, calendula oil, camphor oil, cardamom oil, celery oil, chamomile oil, cinnamon oil, clove oil, coriander oil, lemon grass oil, cypress oil, cumin seed oil, davana oil, dill seed oil, eucalyptus oil, fennel seed oil, garlic oil, geranium oil, ginger oil, grape seed oil, hyssop oil, jasmine oil, juniper berry oil, lavender oil, lemon oil, lime oil, myrrh oil, neroli oil, neem oil, nutmeg oil, palm Rosa oil, parsley oil, peppermint oil, rose oil, rosemary oil, rose wood oil, sage oil, sesame oil, spearmint oil, tarragon oil, tea tree oil, thyme oil, tangerine oil, turmeric root oil, vetiver oil, wormwood oil, and yara yara oil.

The particular lipid carrier included in a particular embodiment of the antioxidant emulsion composition may be selected based on at least one of at least several factors including the particular species of other ingredients included in the composition and the particular type of fat source to be stabilized. In an exemplary embodiment, the lipid carrier is the same species as the fast source to be stabilized. For example, if an antioxidant emulsion composition is to be added to poultry fat, then an exemplary lipid carrier is poultry fat.

(II) Preparation of Antioxidant Emulsion Composition

The various embodiments of the antioxidant emulsion compositions may be prepared using any suitable method known in the art. Typically, the at least one ingredient and the lipid carrier may combined with the quercetin and mixed vigorously to form the emulsion. Suitable non-limiting examples of suitable mixing techniques include shaking, agitation, stirring, blending, homogenization, sonication, propeller mixing, turbine mixing, colloid milling, microfluidizing, and high-shear mixing.

In an exemplary embodiment, lecithin and a lipid carrier are combined with quercetin such that the mass ratio of quercetin to lecithin is about 1:5, and stirred vigorously to form the emulsion. The resulting emulsion may include about 40% by weight of lipid carrier in this embodiment.

The method of preparation of the antioxidant emulsion composition may vary depending on at least one of several factors including but not limited to the particular species of the at least one other ingredients and the species of the lipid carrier, and the amount of quercetin and the at least one other ingredient relative to the amount of lipid carrier.

(III) Fat Source Compositions

In various embodiments, the antioxidant emulsion composition may be contacted with a fat source to produce a fat source composition. Due to the antioxidative efficacy of the quercetin and at least one other ingredient included in the antioxidant emulsion composition, the fat source composition is significantly stabilized relative to the fat source alone. Because the lipid carrier of the antioxidant emulsion composition is typically miscible with the fat source, the antioxidant emulsion composition may be essentially uniformly distributed throughout the fat source by methods known in the art including but not limited to stirring, shaking, and agitation. For example, more vigorous methods of distributing the antioxidant emulsion composition within a solid fat source may be needed compared to within a liquid fat source.

A suitable amount of antioxidant emulsion composition to be contacted with the fat source to form the fat source composition may be selected using one or more of several factors including the particular composition of the antioxidant emulsion composition, the species of fat source to be stabilized, and the degree of stabilization against oxidation desired. Because of the synergistic antioxidative effects of the quercetin and the at least one other ingredient, typically lower amounts of antioxidant emulsion composition may be contacted with the fat source compared to existing antioxidant emulsion compositions.

In an embodiment, the fat source composition may include the antioxidant emulsion composition in an amount may be contacted with a fat source in an amount ranging from about 0.05% to about 3% by mass. In other embodiments, the antioxidant emulsion composition may be contacted with a fat source in an amount ranging from about 0.05% to about 0.1% by mass, from about 0.075% to about 0.15% by mass, from about 0.1% to about 0.2% by mass, from about 0.15% to about 0.25% by mass, from about 0.2% to about 0.4% by mass, from about 0.3% to about 0.5% by mass, from about 0.4% to about 0.6% by mass, from about 0.5% to about 1% by mass, from about 0.75% to about 1.25% by mass, from about 1% to about 2% by mass, from about 1.5% to about 2.5% by mass, and from about 2% to about 3% by mass.

Fat sources suitable for embodiments of the fat source compositions may include one of more of the lipid carrier compounds described above. In particular, fat sources may be any liquid, semi-solid, or solid lipid compound or mixture of compounds derived synthetically, or from animal or plant sources, including but not limited to PUFAs, plant oils such as soybean oil or corn oil, animal oils such as poultry fat and fish oil, animal meals such as pultry meal, turkey meal and fish meal, or mixtures of plant and animal fats such as yellow grease.

(IV) Exemplary Embodiments

Table 1 below summarizes the compositions of exemplary embodiments of the antioxidant emulsion composition:

TABLE 1

Exemplary Antioxidant Emulsion Compositions

| Antioxidant Emulsion Ingredient | | | | Ratio of Ingredients | Fat Source to be Stabilized |
|---|---|---|---|---|---|
| 1 | 2 | 3 | 4 | | |
| Quercetin (Q) | Lecithin | Lipid Carrier | | 1:3-1:5 (Q:L) | Liquid |
| Quercetin (Q) | Phosphoric Acid (PA) | Lipid Carrier | | 1:2.5-1:8 (Q:PA) | Solid or Semi-solid |
| Quercetin (Q) | Lecithin | Propyl Gallate (PG) | Lipid Carrier | >1:4:0.25 (Q:L:PG) | Fish Oil |
| Quercetin (Q) | Ethoxyquin (E) | Lipid Carrier | | 1:0.25-1:1 (Q:E) | Fish Oil |

DEFINITIONS

To facilitate understanding of the invention, several terms are defined below.

The term "emulsion," as used herein, denotes a dispersed system containing at least two immiscible liquid phases typically including a hydrophobic phase and a hydrophilic phase. An emulsion includes a dispersed phase, a continuous phase and an optional emulsifying agent or surfactant. The various embodiments of the antioxidant emulsion composition typically include a multiplicity of particles of dispersed phase that include the quercetin and at least one additional ingredient such as lecithin, distributed through the continuous phase that includes the lipid carrier. By contrast, a liposome denotes a vesicle made of a plurality of amphiphilic molecules in an aqueous (i.e. non-lipid) carrier in which the hydrophilic heads of the amphiphilic compound are situated on the surface of the vesicle in contact with the aqueous carrier, and the hydrophobic tails are situated within the interior of the liposome due to the repellent nature of the surrounding aqueous carrier.

The term "lipids", as used herein, describes groups which typically include long-chain hydrocarbons such as fatty acids, fatty acid esters, and phospholipids. Lipids may be compounds purified from a mixture such as oleic acid, or lipids may be mixtures of specific compounds derived from plant or animal sources such as plant oil or animal fat.

The term "fat source", as used herein, generally describes edible mixtures of lipids in liquid, semi-solid, or solid form. Non-limiting examples of fat sources include poultry fats, animal fats, fish oils, fish meals, vegetable oils, and yellow grease.

The term "synergism", as used herein, refers to the phenomenon of the antioxidative effect of two compounds in combination exceeding the effect of each compound individually, or the sum of the individual effects.

The terms "flavonoid", as used herein, refers to a class of plant secondary metabolites derived from 2-phenylchromen-4-one (2-phenyl-1,4-benzopyrone) structure such as quercetin or rutin. Flavonoids are known to be antioxidant as well as possibly exerting cancer-preventative and vasoprotective effects in vivo.

As various changes could be made in the above compositions, methods of production and methods of use without departing from the scope of the invention, it is intended that all matter contained in the above description and in the examples given below, shall be interpreted as illustrative and not in a limiting sense.

EXAMPLES

The following examples detail various embodiment of the invention.

Example 1

Stabilization of Poultry Fat with Quercetin in Combination with Other Antioxidants To assess the effectiveness of quercetin and quercetin in combination with lecithin at stabilizing poultry fat against oxidation, the following experiment was conducted.

Unstabilized poultry fat that was stored at −20° C. was thawed and divided into 50 g aliquots. An amount of quercetin, a commercially-available tocopherol mixture (MTS-90, Archer Daniels Midland Company, Decatur, Ill., USA), a commercially available antioxidant mixture including beta-carotene and lutein (Oxistoplmmune, IQF/Carotech, Spain)), and soybean oil was added to each aliquot at concentrations summarized in Table 2. A 20 g sample from each aliquot was weighed into separate 100 mL test tubes and placed into an AOM oil bath maintained at 100° C. Compressed air was forced through the tubes per the AOM Standard Method. A peroxide value (PV) was determined by AOCS peroxide value titration after twenty (20) hours for each sample. The measured PVs for all samples are summarized in Table 2.

TABLE 2

Poultry Fat Stabilization Compositions

| Quercetin (ppm) | MTS 90 (ppm) | Oxistop (ppm) | Soybean Oil (ppm) | PV @ 20 hr. (meq/kg) |
|---|---|---|---|---|
| 0.000 | 0 | 0.0 | 0 | 170.457 |
| 0.007 | 140 | 7.5 | 551 | 10.089 |
| 0.012 | 241 | 13.0 | 945 | 7.662 |

The samples to which quercetin and the other adjuvants were added were significantly stabilized against oxidation relative to the negative control samples to which no stabilizing agents were added. The stabilization of the poultry fat appeared to be dose-dependent, since the PV was considerably lower for those samples to which higher amounts of the quercetin and the other adjuvants were added.

The results of this experiment demonstrated that quercetin in combination with the other adjuvants was effective at reducing oxidation in poultry fat.

Example 2

Stabilization of Poultry Fat with Quercetin and Soy Lecithin

To assess the effectiveness of quercetin in combination with soy lecithin at stabilizing poultry fat against oxidation, the following experiment was conducted.

Unstabilized poultry fat that was stored at −20° C. was thawed and divided into 15 g aliquots. To different aliquots, quercetin in poultry fat, and emulsions formed by the vigorous mixing of quercetin with soy lecithin and poultry fat were added in various combinations summarized in Table 3.

A 5 g sample from each aliquot was weighed into separate 100 mL test tubes and placed into an OSI instrument set at 110° C. Compressed air was forced through the tubes per the OSI Standard Method. Induction times were determined by the OSI Standard Method and are summarized in Table 3.

TABLE 3

Quercetin/Lecithin Poultry Fat Stabilization Compositions

| Quercetin (ppm) | Soy Lecithin (ppm) | Poultry Fat (ppm) | Quercetin: Lecithin Ratio | Induction Time (hrs) |
|---|---|---|---|---|
| 0 | 0 | 0 | — | 5.44 |
| 500 | 0 | 9500 | — | 22.80 |
| 560 | 593 | 8847 | 1:1.06 | 23.60 |
| 487 | 1567 | 7947 | 1:3.22 | 25.25 |
| 760 | 2433 | 6807 | 1:3.20 | 28.00 |
| 567 | 3540 | 5893 | 1:6.24 | 24.45 |

The induction time was significantly higher for all added stabilization compositions compared to the negative control samples, to which no stabilizers were added. The addition of quercetin in combination to lecithin resulted in more effective stabilization than the stabilization with quercetin alone. For those samples to which about 500 ppm of quercetin was added, a quercetin:lecithin ratio of about 1:3 resulted in the highest induction time. For the two samples to which quercetin and lecithin was added in a 1:3 ratio, higher amounts of quercetin and lecithin resulted in higher inductions times.

The results of this experiment demonstrated that quercetin in combination with lecithin was an effective stabilizer for poultry fat. At the experimental conditions tested, a 1:3 ratio of quercetin:lecithin was the most effective at stabilizing poultry fat.

Example 3

Stabilization of Poultry Fat with Quercetin and Phosphoric Acid

To assess the effectiveness of quercetin in combination with phosphoric acid at stabilizing poultry fat against oxidation, the following experiment was conducted.

Aliquots of unstabilized poultry fat were prepared as described in Example 2. To different aliquots, quercetin and 85% phosphoric acid were added, both singly and in combination, as summarized in Table 4. Induction times for each sample were measured using the methods described in Example 2. The results of the OSI measurements of induction times from the samples are summarized in Table 4:

TABLE 4

Quercetin/Phosphoric Acid Poultry Fat Stabilization Compositions

| Quercetin (ppm) | Phosphoric Acid (ppm) | Quercetin: Phosphoric Acid Ratio | Induction Time (hrs) |
|---|---|---|---|
| 0 | 0 | — | 4.43 |
| 400 | 0 | — | 9.58 |
| 500 | 0 | — | 10.59 |
| 0 | 1250 | — | 5.02 |
| 0 | 1500 | — | 4.58 |
| 400 | 1250 | 1:3.13 | 17.25 |
| 500 | 1500 | 1:3 | 37.61 |

Phosphoric acid alone had little effect on the oxidative stability of the poultry fat, and quercetin alone had a modest stabilizing effect.

However, the quercetin and phosphoric acid, when added at a ratio of about 1:3 had a stabilizing effect that increased the induction time by a factor of at least about 2 compared to the effect of either ingredient alone. The stabilizing effect of the combined quercetin and phosphoric acid increased in a dose-dependent manner.

The results of this experiment demonstrated the quercetin and phosphoric acid exerted a stabilizing effect upon poultry fat in a synergistic manner.

Example 4

Stabilization of Poultry Fat with Quercetin and Citric Acid or Lecithin

To assess the effectiveness of quercetin in combination with citric acid or lecithin at stabilizing poultry fat against oxidation, the following experiment was conducted.

Aliquots of unstabilized poultry fat were prepared as described in Example 2. To different aliquots, quercetin and citric acid were added, both singly and in combination, as summarized in Table 5. For purposes of comparison, Natu-Guard (Novus International, St. Charles, Mo., USA), an all-natural antioxidant composition that included tocopherols and rosemary oil extract, was added to other aliquots as summarized in Table 5. Induction times for each sample were measured using the methods described in Example 2. The results of the OSI measurements of induction times from all samples are summarized in Table 5:

TABLE 5

Quercetin-Based Poultry Fat Stabilization Compositions Compared to NaturGuard

| Quercetin (ppm) | Citric Acid (ppm) | Lecithin (ppm) | NatuGuard (ppm) | Quercetin: Citric Acid or Lecithin Ratio | Induction Time (hrs) |
|---|---|---|---|---|---|
| 0 | 0 | 0 | 0 | — | 5.74 |
| 400 | 0 | 0 | 0 | — | 18.92 |
| 500 | 0 | 0 | 0 | — | 20.51 |
| 600 | 0 | 0 | 0 | — | 24.18 |
| 700 | 0 | 0 | 0 | — | 31.35 |
| 1000 | 0 | 0 | 0 | — | 33.58 |
| 1500 | 0 | 0 | 0 | — | 78.49 |
| 2000 | 0 | 0 | 0 | — | >120 |
| 400 | 200 | 0 | 0 | 2:1 | 18.07 |
| 500 | 200 | 0 | 0 | 2.5:1 | 22.26 |
| 600 | 200 | 0 | 0 | 3:1 | 26.21 |
| 700 | 200 | 0 | 0 | 3.5:1 | 28.91 |
| 500 | 0 | 500 | 0 | 1:1 | 23.60 |
| 500 | 0 | 1500 | 0 | 1:3 | 25.25 |
| 500 | 0 | 2500 | 0 | 1:5 | 28.0 |
| 0 | 0 | 0 | 500 | — | 10.39 |
| 0 | 0 | 0 | 1000 | — | 13.64 |
| 0 | 0 | 0 | 2000 | — | 18.50 |

The addition of quercetin alone or in combination with citric acid or lecithin increased the oxidative stability of the samples significantly more than the samples to which comparable amounts of NatuGuard had been added.

The addition of quercetin alone significantly enhanced the oxidative stability of the poultry fat in a dose-dependent manner. The addition of quercetin in combination with citric acid had differing effects on the oxidative stability of the poultry fat, depending on the ratio of quercetin to citric acid added. For quercetin:citric acid ratios of 2.5:1 and 3:1, the induction times increased by about 8% over the samples with comparable quercetin concentrations added in isolation. However, for quercetin:citric acid ratios of 2:1 and 3.5:1, the addition of citric acid decreased the induction time relative to comparable quercetin-only samples.

The addition of quercetin in combination with lecithin resulted in significant increases in induction times relative to the induction times of samples having a comparable concentration of quercetin added; these increases ranged from about 15% to 37%, depending on the amount of lecithin added. This increase in induction time was enhanced when higher amounts of lecithin relative to quercetin were added to the sample.

The results of this experiment demonstrated the quercetin and lecithin exerted a stabilizing effect upon poultry fat in a synergistic manner. Quercetin and citric acid also exerted a stabilizing effect, but was sensitive to the amount of citric acid relative to the amount of quercetin that was added. All compositions, including quercetin alone, quercetin and citric acid, and quercetin and lecithin, stabilized the poultry fat against oxidation more effectively than comparable amounts of a commercially-available natural additive, NatuGuard.

Example 5

Stabilization of Soybean Oil with Quercetin and Lecithin

To assess the effectiveness of quercetin in combination with lecithin at stabilizing soybean oil against oxidation, the following experiment was conducted.

Aliquots of unstabilized soybean oil were prepared using methods similar to those described in Example 2 for poultry fat. To different aliquots, quercetin and lecithin were added, both singly and in combination, as summarized in Table 6. Induction times for each sample were measured using the methods described in Example 2. The results of the OSI measurements of induction times from the samples are summarized in Table 6:

TABLE 6

Quercetin/Lecithin Soybean Oil Stabilization Compositions

| Quercetin (ppm) | Lecithin (ppm) | Quercetin: Lecithin Ratio | Induction Time (hrs) |
|---|---|---|---|
| 0 | 0 | — | 4.43 |
| 500 | 0 | — | 7.15 |
| 0 | 1000 | — | 5.10 |
| 0 | 1500 | — | 5.15 |
| 0 | 2500 | — | 5.15 |
| 500 | 1000 | 1:2 | 7.15 |
| 500 | 1500 | 1:3 | 8.63 |
| 500 | 2500 | 1:5 | 12.98 |

Lecithin alone had a very modest stabilizing effect on the oxidative stability of the soybean oil that was independent of the amount of lecithin added. Quercetin alone in the amount of 500 ppm had a modest but stronger stabilizing effect on the soybean oil. The effect of quercetin in combination with lecithin on the oxidative stability of the soybean oil was strongly dependent on amount of lecithin relative to quercetin added to the soybean oil. Although the same amount of quercetin (500 ppm) was added to the soybean oil for each combined treatment, the strongest stabilization effects were measured for the highest amount of lecithin added relative to the amount of quercetin added. For quercetin:lecithin ratios at or above 1:3, the combined effect of quercetin and lecithin was higher than the sum of the stabilizing effects of each ingredient in isolation.

The results of this experiment demonstrated the quercetin and lecithin exerted a stabilizing effect upon soybean oil in a synergistic manner.

Example 6

Stabilization of Yellow Grease with Quercetin and Phosphoric Acid

To assess the effectiveness of quercetin in combination with phosphoric acid at stabilizing yellow grease against oxidation, the following experiment was conducted.

Aliquots of unstabilized commercial yellow grease were prepared using methods similar to those described in Example 2 for poultry fat. To different aliquots, quercetin and phosphoric acid were added, both singly and in combination, as summarized in Table 7. Induction times for each sample were measured using the methods described in Example 2. The results of the OSI measurements of induction times from the samples are summarized in Table 7:

TABLE 7

Quercetin/Phosphoric Acid Yellow Grease Stabilization Compositions

| Quercetin (ppm) | Phosphoric Acid (ppm) | Quercetin: Phosphoric Acid Ratio | Induction Time (hrs) |
|---|---|---|---|
| 0 | 0 | — | 3.58 |
| 50 | 0 | — | 3.85 |
| 100 | 0 | — | 5.50 |
| 0 | 150 | — | 6.41 |
| 0 | 250 | — | 6.38 |
| 0 | 400 | — | 10.29 |
| 100 | 150 | 1:1.5 | 6.84 |
| 100 | 250 | 1:2.5 | 7.27 |
| 50 | 400 | 1:8.0 | 13.54 |

Quercetin alone had a modest dose-dependent effect on the oxidative stability of the yellow grease. Phosphoric acid had a stronger stabilizing effect than the quercetin alone on the yellow grease; this effect increased only at the highest concentration of 400 ppm. The quercetin and phosphoric acid in combination imparted moderately higher stability to the yellow grease relative to either ingredient alone, and this stability increased as the proportion of phosphoric acid increased relative to the quercetin.

The results of this experiment demonstrated the quercetin and phosphoric acid exerted a stabilizing effect upon poultry fat in a synergistic manner.

Example 7

Stabilization of Fish Oil with Quercetin and Other Adjutants

To assess the effectiveness of quercetin in combination with other adjutants at stabilizing fish oil against oxidation, the following experiment was conducted.

Aliquots of unstabilized fish oil were prepared using methods similar to those described in Example 2 for poultry fat. To different aliquots, quercetin, lecithin, ethoxyquin, and propyl gallate were added, both singly and in combination, as summarized in Table 8. Induction times for each sample were measured using the methods described in Example 2. The results of the OSI measurements of induction times from the samples are summarized in Table 8:

TABLE 8

Quercetin Fish Oil Stabilization Compositions

| Quercetin (Q-ppm) | Lecithin (L-ppm) | Propyl Gallate (PG-ppm) | Ethoxyquin (E-ppm) | Ratio of Ingredients | Induction Time (hrs) |
|---|---|---|---|---|---|
| 0 | 0 | 0 | 0 | — | 4.57 |
| 500 | 0 | 0 | 0 | — | 15.50 |
| 0 | 2500 | 0 | 0 | — | 4.63 |
| 0 | 0 | 200 | 0 | — | 11.10 |
| 0 | 0 | 0 | 500 | — | 23.73 |
| 500 | 2500 | 200 | 0 | 1.0:5.0:0.4 (Q:L:PG) | 27.45 |
| 250 | 0 | 0 | 250 | 1:1 (Q:E) | 34.27 |

Quercetin, propyl gallate, and ethoxyquin all imparted a degree of oxidative stability when added in isolation to the fish oil samples. Lecithin in isolation had negligible effect on the oxidative stability of fish oil. The combination of quercetin, lecithin, and propyl gallate imparted a significantly higher degree of oxidative stability in combination than any single ingredient in isolation. Similarly, a combination of quercetin and ethoxyquin resulted in a significantly higher oxidative stability than either of the ingredients in isolation, even when the isolated ingredients were added at twice the concentration of the combined ingredients.

The results of this experiment demonstrated the quercetin and the various adjuvants exerted a stabilizing effect upon fish oil in a synergistic manner.

Example 8

Stabilization of Soybean Oil with Quercetin and Lecithin Relative to Other Additives To compare the effectiveness of quercetin in combination with lecithin relative to other commercially available additives at stabilizing soybean oil against oxidation, the following experiment was conducted.

Aliquots of unstabilized soybean oil were prepared using methods similar to those described in Example 2 for poultry fat. To different aliquots, quercetin and lecithin (AOX VO-1 1°) were added at concentrations of up to about 1000 ppm. For comparison other stabilizing additives were added to other aliquots: a mixture of ethoxyquin and TBHQ (SQ4T) at concentrations up to about 1500 ppm; a mixture of tocopherols, rosemary extract, and soybean oil (NatuGuard, Novus International, St. Charles, Mo., USA) at concentrations up to 2000 ppm; and a mixture with a high percentage of delta-tocopherols, rosemary extract, and an oil carrier (NaturOx TX, Kemin Industries, Inc., USA) at concentrations up to 2000 ppm. Induction times for each sample were measured using the methods described in Example 2. The results of the OSI measurements of induction times from all samples are summarized in FIG. 1.

As shown in FIG. 1, the AOX VO-1 1° composition had the most stabilizing effect against oxidation of the soybean oil compared to the other treatments at all concentrations added to the samples. The natural antioxidant compositions (NatuGuard and NaturOx) had negligible effect on the oxidative stability of the samples to which they were added, even at concentrations of up to 2000 ppm. The addition of ethoxyquin and TBHQ at concentrations of up to 1500 ppm resulted in only modest increases in the oxidative stability of those samples. The AOX VO-1 1° composition had induction times in excess of any other composition starting at AOX VO-1 1° concentrations of about 200 ppm and above.

The results of this experiment demonstrated the quercetin and lecithin antioxidant composition exerted a strong stabilizing effect upon soybean oil in a dose-dependent manner.

What is claimed is:

1. An emulsion comprising quercetin, lecithin, and a lipid carrier, wherein the ratio of quercetin to lecithin is from about 1:3 to about 1:5.

2. The emulsion composition of claim 1, wherein the lipid carrier has a concentration ranging from about 30% to about 70% by weight.

3. The emulsion composition of claim 1, wherein the ratio of quercetin to lecithin is about 1:3.

4. The emulsion composition of claim 1, wherein the ratio of quercetin to lecithin is about 1:4.

5. The emulsion composition of claim 1, wherein the ratio of quercetin to lecithin is about 1:5.

6. A composition comprising a liquid fat source and an emulsion comprising quercetin, lecithin, and a lipid carrier, wherein the ratio of quercetin to lecithin is at least 1:3.

7. The composition of claim 6, wherein the ratio of quercetin to lecithin is from about 1:3 to about 1:5.

8. The composition of claim 6, wherein the ratio of quercetin to lecithin is about 1:4.

9. The composition of claim 6, wherein the ratio of quercetin to lecithin is about 1:5.

10. The composition of claim 6, wherein the emulsion has a concentration ranging from about 0.5% to about 3% by weight of the composition.

11. The composition of claim 6, wherein the quercetin has a concentration ranging from about 10 ppm to about 500 ppm.

12. A method to reduce the oxidation of a liquid fat source, the method comprising contacting the liquid fat source with the emulsion of claim 1.

13. The method of claim 12, wherein the emulsion has a weight ranging from about 0.5% to about 3.0% of the mass of the liquid fat source.

14. The method of claim 12, wherein quercetin has a concentration ranging from about 10 ppm to about 500 ppm of the combined mass of the liquid fat source and the emulsion.

15. The method of claim 12, wherein the liquid fat source is chosen from an animal fat source and a plant fat source.

* * * * *